United States Patent [19]

Kochendorfer

[11] 4,397,609

[45] Aug. 9, 1983

[54] BANDAGE FOR RADIALLY STRESSING THE SEGMENTS OF A COMPRESSOR ROTOR FOR A TURBINE

[76] Inventor: Richard Kochendorfer, Silberwaldstrasse 1, 7000 Stuttgart 75, Fed. Rep. of Germany

[21] Appl. No.: 304,013

[22] Filed: Sep. 21, 1981

[30] Foreign Application Priority Data

Oct. 3, 1980 [DE] Fed. Rep. of Germany ....... 3037388

[51] Int. Cl.³ ............................ F01D 5/30; F01D 5/00
[52] U.S. Cl. ................................. 416/214 R; 416/204; 416/218
[58] Field of Search ........... 416/218, 230, 229, 241 A, 416/204, 214 R; 156/137; 428/212

[56] References Cited

U.S. PATENT DOCUMENTS

| | | | |
|---|---|---|---|
| 3,127,304 | 3/1964 | Borup | 428/212 X |
| 3,554,667 | 1/1971 | Wagle | 416/218 X |
| 3,787,141 | 1/1974 | Walsh | 416/230 X |
| 3,813,185 | 5/1974 | Bouiller et al. | 416/218 X |
| 3,904,316 | 9/1975 | Clingman et al. | 416/218 |
| 4,191,510 | 3/1980 | Teysseyre et al. | 416/218 X |
| 4,339,229 | 7/1982 | Rossman | 416/218 |

FOREIGN PATENT DOCUMENTS

| | | |
|---|---|---|
| 1751156 | 10/1970 | Fed. Rep. of Germany . |
| 2507512 | 9/1977 | Fed. Rep. of Germany . |
| 2441249 | 4/1979 | Fed. Rep. of Germany . |
| 1296310 | 11/1972 | United Kingdom ................ 416/218 |
| 1553038 | 9/1979 | United Kingdom ................ 416/218 |

OTHER PUBLICATIONS

Agard Conference Proceedings No. 112, Impact of Composite Materials on Aerospace Vehicles and Propulsion Systems, May 1973.

*Primary Examiner*—Philip R. Coe
*Assistant Examiner*—Thomas W. Epting
*Attorney, Agent, or Firm*—Laubscher, Philpitt & Laubscher

[57] ABSTRACT

A compressor rotor for a turbine comprises individual segments radially stressed by a bandage of fibre-reinforced material which is under prestress when the rotor is stationary. The bandage cross-section has regions of different stiffness and different tensile strength, constituted by retaining rings arranged one inside another or side-by-side.

10 Claims, 5 Drawing Figures

BANDAGE FOR RADIALLY STRESSING THE SEGMENTS OF A COMPRESSOR ROTOR FOR A TURBINE

FIELD OF THE INVENTION

The invention relates to a bandage of fiber-reinforced material for radially stressing the segments of a compressor rotor comprising individual segments and intended for turbines, which bandage is under prestress when the rotor is stationary.

Axial compressor rotors for gas turbines are used in aircraft propulsion turbines for conveying and pumping the combustion air. To increase operational reliability and to improve performance, efforts are made to obtain lightweight rotors with a low moment of inertia and therefore advantageous acceleration characteristics; on the other hand it is essential to ensure that such rotors are able to meet the stringent requirements regarding long-term stability, despite the high centrifugal stresses imposed at high speed.

PRIOR ART

The prior art discloses rotors in which blades of laminated fiber material are mounted by means of dovetailed roots on a disk of integral construction. This calls for a substantial material volume for the disk and leads to high dynamic mass forces. Owing to the different expansion characteristics of the disk and of the ring, these forces are only inadequately absorbed by laminated fiber material bandages. (Stargardter, Jakobsen, Boron-Polyimide reinforced titanium fan disks, Agard-Conference proceedings No. 112, May 1973, pp. 21-1 ff).

The rotor blades of another known axial rotor are engaged with the fiber-reinforced retaining rings by means of a bolt root mounting. Such mounting of the metallic blades does not lead to a uniform transfer of the centrifugally induced blade forces into the retaining rings. Stress peaks therefore result in the polygonal stress characteristics. Moreover, when using this kind of blade mounting for disks of small diameter, it is not possible to obtain the shear stress transfer surface required for laminated fiber blades (German Pat. No. 24 41 349).

In a disk-shaped rotor for a high-speed axial gas turbine the rotor, constructed of ceramics, comprises individual segments which are stress-mounted on a disk by means of a shrinkage bandage of fiber material. Under stationary conditions the bandage must be under tensile prestress sufficiently large to ensure that during operation of the rotor no substantial tensile stresses are imposed on the rotor blade components which are stress-mounted together, (German Pat. No. 25 07 512).

As in other known devices, however, it has been found that in special ranges of use the bandages are unable to absorb in a desirable manner the tensile forces acting upon them, more particularly in the case of turbines operating at very high speeds. To some extent, the tensile strength of the fiber-reinforced material bandages is insufficient and to some extent the bandages are damaged in the region of stress peaks, i.e. in the region in which gaps appear, between the segments of a segmentally constructed rotor, at elevated rotational speeds, and such gaps necessarily lead to stress peaks in the surrounding bandages. It is particularly bandages with a high degree of stiffness which are prone to such faults.

OBJECTS OF THE INVENTION

What is desired is a bandage of the kind described hereinbefore that can more readily meet the more stringent requirements imposed by high speed, segmentally constructed rotors.

SUMMARY OF THE INVENTION

The present invention provides a bandage of the kind described hereinbefore, which has different cross-sectional regions with different stiffness and different tensile strength.

In this way it is possible to adapt the bandage under optimum conditions to the prevailing mechanical stresses and to ensure that as far as possible no local overstressing of the bandages occurs.

One preferred embodiment comprises at least two annular regions or retaining rings, disposed one above the other, of which the inner ring is prestressed and has a high tensile strength and the outer is not prestressed and has a high stiffness. This construction offers the advantage that the inner part of the bandage, which bears on the contact surface of the segments, and has a high tensile strength, performs the prestressing function. It is, however, not necessary for the inner region or retaining ring to also have a high stiffness so that it would be particularly prone, as already described, to stress peaks. Instead, it is possible to select a material combination which does not have a particularly high stiffness and is therefore not particularly sensitive to stress peaks. On the other hand, owing to its high tensile strength, the inner retaining ring ensures that the required prestress and the stress for compensating the centrifugal forces in operation are available.

The inner retaining ring is surrounded by an outer retaining ring of high stiffness which prevents excessive overall expansion of the rotor. The outer ring of high stiffness, on the other hand, need not have such a high strength as the inner retaining ring, since the prestress is taken substantially by the inner retaining ring. Such a combination in a bandage makes it possible to apply an altogether higher compressive prestress to the segments so that gap formation between the individual segments can be substantially avoided, even at elevated speeds.

Since in mechanical terms the prestressed segments in the compression region act as an integral disc, it follows that no stress peaks and no imbalance problems occur until a gap is formed. If the gap is formed only at elevated speeds, as intended, the individual segments will be thrust by the high centrifugal forces against the bandage so strongly that they cannot become displaced due to gas or mass forces and any increase in the unbalance is avoided.

Another preferred embodiment provides that, when the rotor is stationary, the bandage bears only upon that region of the segment support surface which is subjected to substantial deformation during rotation but a spacing is provided in the remaining region between the bandage and the segment support surface, which spacing is so dimensioned that the bandage in this region bears upon the segment support surface only when the rotational speed rises.

This embodiment also makes it possible to take account of the different deformation characteristics of the segment support surface. As a rule, the segment support surface, one side of which is connected to the blade root, ends freely on the opposite side so that the deformation in the outer region of the support surface and the deformation in the region nearest to the root are very different. It can normally be observed that a substantially greater deformation occurs at the free end. In this case it is advantageous to select the distance between the support surface and the internal surface of the bandage so that an increasing speed causes the bandage to progressively bear upon the support surface.

Advantageously, a gap of progressively increasing thickness is provided between the inner retaining ring and the support surface and the cross-sectional contour of the gap is advantageously selected so that the mechanical stresses to be absorbed by the bandage do not exceed specific limiting values, i.e. no excessive elongation values occur in the region of the support surface which is subject to greater deformation. To this end it is also possible to arrange that the retaining ring has at least two regions of different internal diameter and has a high tensile strength and high elongation values in the bearing region and high stiffness in the non-bearing region. The region of the segment support surface which is non-bearing when the system is at rest makes contact only at relatively high rotational speeds, so high extensibility and particularly high tensile strength are not necessary, but the part of the bandage which bears on the substantially deforming region of the support surface must have high extensibility and high tensile strength.

It is particularly advantageous if metal rings are inserted between the bandage and the support surface and/or the side surfaces of the bandage and the adjoining actual segment support surface. These rings, which can be very thin, equalize stress peaks and, in the event of gaps occurring between adjacent segments, reliably prevent parts of the bandage from penetrating into the gaps and are clamped thereby when as a result of a reduction of the rotational speed the segments are again pressed against each other under the effect of the tensile stress of the bandage.

In an embodiment with a plurality of rotors disposed at an axial distance from each other, it is possible to provide spacer sleeves of fiber-reinforced material between adjacent rotors in which the end regions of the sleeves are part of the bandages associated with the two rotors. The spacer sleeves may only partially cover the bandage layers disposed therebelow.

To this end it is particularly advantageous if frictional engagement exists between the end regions of the spacer sleeve and the covered region of the retaining ring disposed therebelow and tensile strength and stiffness in the end regions of the spacer sleeve are selected so that the frictional force does not drop below a minimum value over the entire speed range of the rotor.

Stiffness and tensile strength can be so selected that a nearly constant frictional force is maintained in the covering end regions of the spacer sleeve over the entire speed range, i.e. deformation of the covered retaining rings on the outer circumferential surface corresponds to the deformation at the inner circumferential surface of the end region of the spacer sleeve.

It is, however, also possible to arrange the end regions of the spacer sleeves so that they not only contribute a constant value to the inwardly oriented stress, but contribute a value which increases with increasing rotational speed. This is achieved if the elongation of the spacer sleeve and region under the effect of centrifugal forces is less than the elongation of the external circumference of the covered retaining rings due to dynamic stresses.

BRIEF DESCRIPTION OF THE DRAWINGS

The invention will be described further, by way of example, with reference to the accompanying drawings, in which.

DESCRIPTION OF PREFERRED EMBODIMENTS

Figure 1:
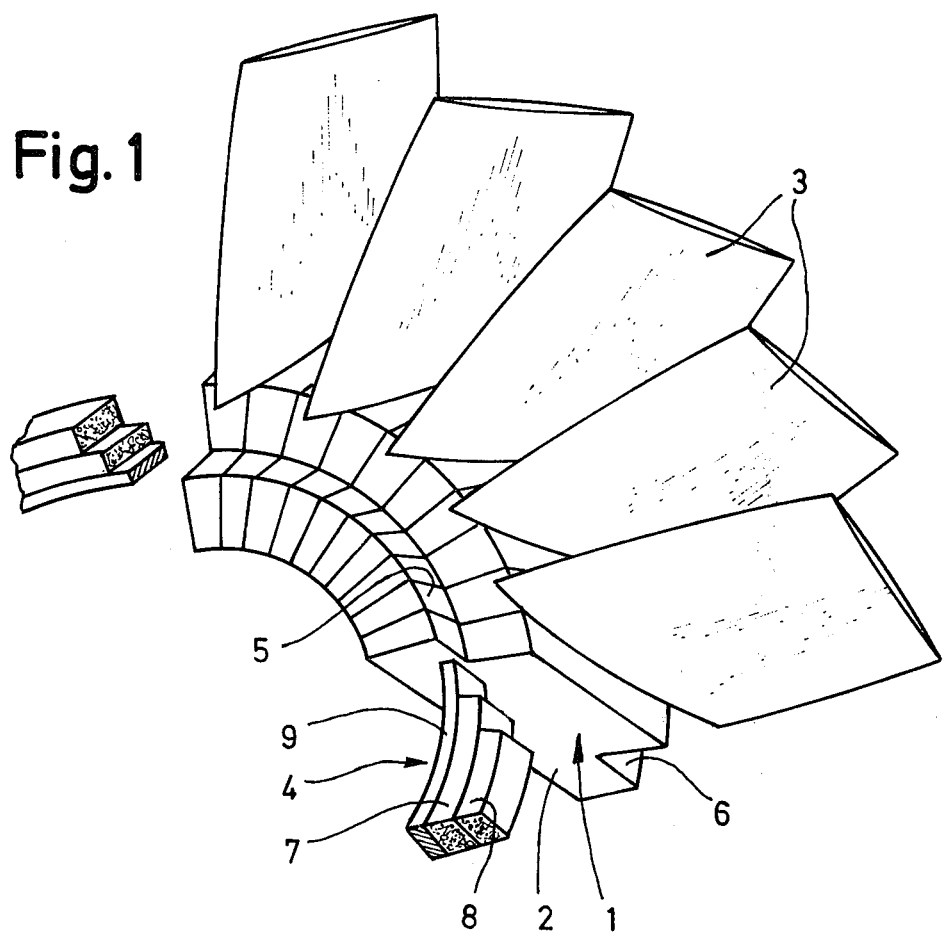
FIG. 1 is a perspective part view of a compressor rotor and a sectioned bandage provided for stressing the rotor segments in the radial direction.

The basic construction of a compressor rotor for an axial gas turbine is shown in FIG. 1. The rotor comprises individual segments 1, each of which comprises a segmental root or base 2 and a compressor blade 3 retained thereon. The root 2 advantageously consists of a material of low density, for example aluminum and the compressor blades can be constructed of, for example, fiber-reinforced aluminum. For operation at high rotational speeds it is essential on the one hand for the entire construction to have low masses and on the other hand for the moment of inertia to be low, i.e. for the masses to be concentrated as closely as possible to the axis.

In order to retain the individual segments 1 together, they are all radially inwardly stressed by means of two coaxially disposed annular bandages or retainers 4 which bear on corresponding shoulders 5 and 6 on the inflow side of the compressor rotor and on the exit side, respectively. To improve clarify, FIG. 1 shows only the bandage 4 on the inflow side, this bandage being shown sectioned to clearly show its construction. The bandage comprises two retaining rings 7 and 8, one disposed above the other, both constructed of fiber-reinforced material, more particularly carbon reinforced epoxy resin or polyimide resin or boron reinforced aluminum. It is possible to use other material combinations, provided they have the properties described below.

The inner ring 7 is of low density and has a very high tensile strength 6, for example a tensile strength of the order of 1 500 N/mm$^2$ if carbon reinforced epoxy resin is used, while a high stiffness E/P is essential for the outer ring 8 (stiffness being the modulus of elasticity E divided by the density p). A modulus of elasticity of the order of 200 to 250 kN/mm$^2$ is desirable for the outer ring to restrict widening to the least possible extent.

The stiffness or rigidity of the inner ring 7, on the other hand, can be less and it is possible for a modulus of elasticity of the order of 120 to 150 kNmm$^2$ to be employed. By analogy, the tensile strength of the outer ring 8 can be relatively low and can be, for example, of the order of 800 to 900 N/mm$^2$.

Altogether, a combination of an inner retaining ring of high tensile strength but low stiffness with an outer retaining ring of low tensile strength but high stiffness is thus obtained.

Advantageously, the inner ring 7 is shrink-mounted, i.e. it powerfully stresses the individual segments 1 together when the rotor is stationary. The outer ring 8 can be so dimensioned that it surrounds the inner ring 7 without any substantial prestress, so that the radial compressive stress acting on the segments is applied substantially only by the inner ring when the rotor is stationary.

In operation, both retaining rings expand under the effect of centrifugal forces with increasing rotational speed. Owing to its high stiffness, the outer ring 8 will therefore increasingly contribute to the inwardly oriented compressive stressing or in other words it will co-absorb the centrifugal forces which arise. Reaching of the breaking stress is avoided by suitable selection of the individual cross-sectional areas of the rings.

In the embodiment illustrated in FIG. 1 a thin ring 9 of ductile material, e.g. steel, is inserted between the inner retaining ring 7 and the shoulder 5. This functions as a support for the ring 7 and prevents material of the ring 7 from penetrating into the narrow gaps which can occur between the segments at high rotational speed. Damage of the ring 7 by the edges of the segments is thus avoided. Furthermore, this ensures that the material of the ring 7 is not jammed by the closing gaps of the segments when the rotational speed is reduced.

The exit side bandage, not shown in FIG. 1, can be constructed in like manner to the intake side bandage.

Figure 2:
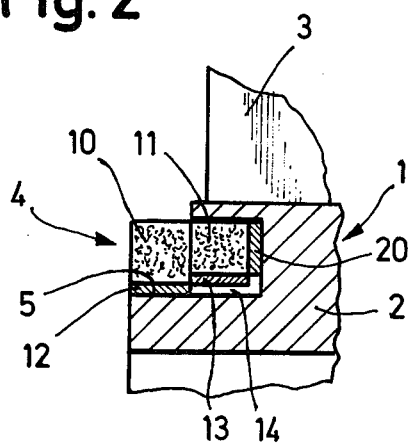
FIG. 2 is a partial sectioned view through the root of a rotor segment and the bandage, according to one preferred embodiment.

FIG. 2 shows a bandage in which the base of each segment is also modified: the bandage 4 bearing on the shoulder 5 is at least partially inserted into an annular groove in the root 2, which is cut in laterally.

In this embodiment the bandage comprises two adjacent retaining ring 10 and 11, one behind the other. The front retaining ring 10 (like the inner retaining ring 7 of FIG. 1) consists of a material high tensile strength and high elongation but not necessarily of high stiffness, while the rear retaining ring 11 (like the outer retaining ring 8 in FIG. 1) is constructed of a material of high stiffness but not necessarily of high tensile strength.

In a manner similar to that shown in FIG. 1, a metal ring 12 (e.g. of steel) is inserted between the front ring 10 and the support surface provided by the shoulder 5. The dimensions of the ring 10 are selected so that it generates a radial compressive stress, i.e. it clamps the segments together, when the rotor is stationary.

A metal ring 13 (e.g. of steel) is also inserted between the rear retaining ring 11 and the shoulder 5 (which extends into the groove in the root 2). However, the dimensions of the ring 11 are selected so that a slight gap 14 remain between the shoulder 5 and the ring 13 or between the ring 13, stressed on the shoulder, and the ring 11 when the rotor is stationary. This gap has very small dimensions of the order of 0.01 mm; for clarity, its size is greatly exaggereated in FIG. 2.

Finally, a further ring 20 of ductile material (e.g. steel) is disposed between the rear surface of the rear retaining ring 11 and the front-facing surface of the groove in the root 2 with the object of preventing damage of the retaining ring 11 due to jamming of its material in gaps between the segments at high rotational speeds, in the same manner as the metal rings which surround the shoulder 5.

At rest, and at low rotational speeds, the segments are stressed together substantially by the front retaining ring 10, which is able to absorb centrifugal forces occurring at low rotational speeds. Owing to the high tensile strength but not very great stiffness of the ring 10, increasing rotational speeds result in a deformation of the unit comprising the shoulder 5 and the ring 10 and 12 under the effect of centrifugal forces. The rear retaining ring 11 on the other hand, which has a very high stiffness, is only slightly expanded under the effect of its own centrifugal force acting upon it, so that with an increasing speed the support surface of the shoulder 5 bears upon the internal surface of the ring 11, which is thus additionally employed for generating an internally oriented compressive stress as the rotational speed continues to rise. The gap 14 therefore "switches in" the rear retaining ring 11 only at elevated rotational speeds.

Figure 3:
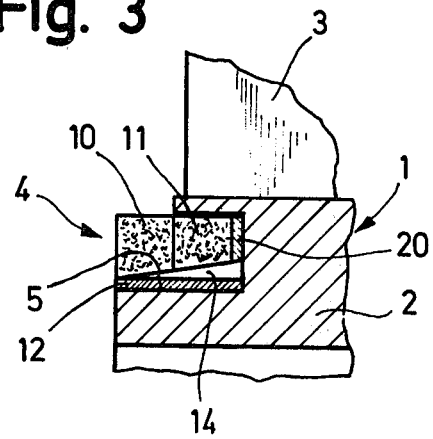
FIG. 3 is a view similar to FIG. 2, according to another preferred embodiment.

A similar embodiment is shown in FIG. 3; corresponding components have the same reference numerals. By contrast to the embodiment of FIG. 2, the entire shoulder support surface is surrounded by a single metal ring 12 which extends over the entire width of the bandage. The two adjacently disposed retaining rings 10 and 11 have a sloping contour on the side nearest to the shoulder 5, i.e. between the retaining rings 10 and 11 and the metal ring 12 there is a gap 14 whose width increases from the front to the rear. The size of the gap is of the order of a few hundredths of a millimeter and in the interests of clarity is shown in greatly exaggerated form in FIG. 3.

The bandage area which bears on the support surface in this embodiment increases progressively with a rising rotational speed.

Instead of the linearly increasing width of the gap 14 it is also possible to select the contour either of the support surface and/or of the bandage interior in such a way that progressivve bearing of the bandage on the support surface is adapted to the deformation of the root shoulder. This deformation depends, for example, on the cross-section of the shoulder and on the shoulder material.

Combining a bandage region of high tensile strength with a bandage region of high stiffness offers the advantage that in its entirety the bandage is able to absorb centrifugal forces without the retaining ring of high tensile strength but low stiffness and the retaining ring with high stiffness and low tensile strength being stressed beyond their maximum stress values. By providing gaps between the bandages and the support surfaces it is possible more particularly, to ensure that the stiff retaining rings need not absorb excessive elongation, because they bear on the support surface only when it has already experienced a substantial part of the deformation which occurs. The elongation range of the stiff bandage regions may thus be kept small.

Figure 4:
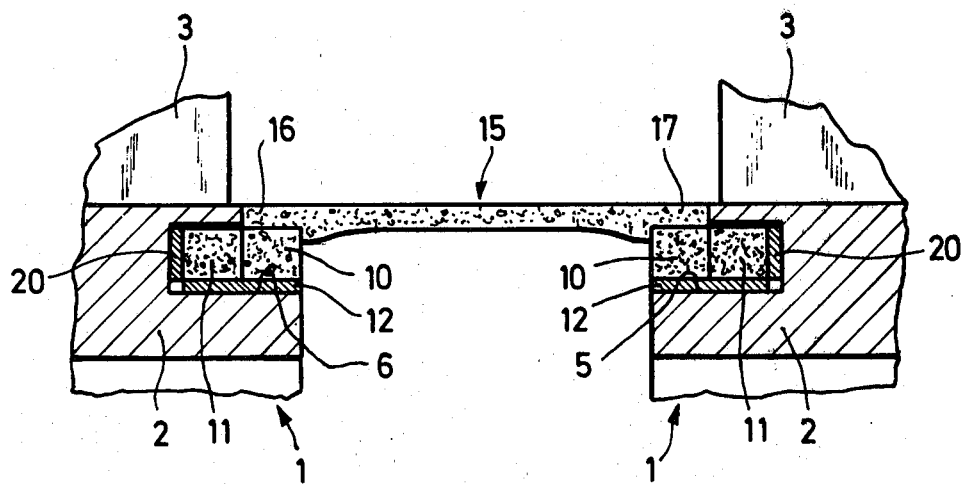
FIG. 4 is a partially sectioned view through the roots of adjacent rotor segments with associated bandages and a spacer sleeve.

The embodiment illustrated in FIG. 4 is constructed similarly to that illustrated in FIGS. 2 and 3; corresponding parts are therefore provided with the same reference numerals.

Segments of adjacent sides of two coaxially disposed rotors are joined to each other by means of a spacer sleeve 15 which is also constructed of fiber-reinforced material. In the illustrated embodiment the end regions 16 and 17 of the sleeve 15 cover the front retaining rings 10. The dimensions are selected so that the end regions 16 and 17 are thrust against the external surfaces of the rings 10 so that frictional engagement is produced between the sleeve 15 and the rings 10.

It is also advantageous if the properties of the material of the end regions of the sleeve 15 are adjusted so that the frictional force is substantially independent of rotational speed. This can be achieved if the elongation properties of the end regions of the sleeve 15 correspond to those of the rings 10. However, it is possible to arrange that, under intrinsic centrifugal force stressing, the end regions of the sleeve 15 expand slightly less than the rings 10. In this case, the end regions of the sleeve 15 progressively absorb part of the centrifugal forces which occur with rising rotational speed of the rotor.

By suitable arrangements of the fibers, the sleeve 5 (between the end regions) is designed in accordance with the requirements made upon it, for example torsional strength, torsional and bending resistance, and/or axial stressability. It is also possible for the thermal expansion characteristics to be "made to measure" and to be adapted to the expansion of the casing so that the gaps between rotor blade and casing are minimized and partial load performance characteristics can be improved.

Different combinations of the previously-described features are also possible. For example, the metal rings in all arrangements can be so disposed as described in each of the exemplified embodiments.

Figure 5:
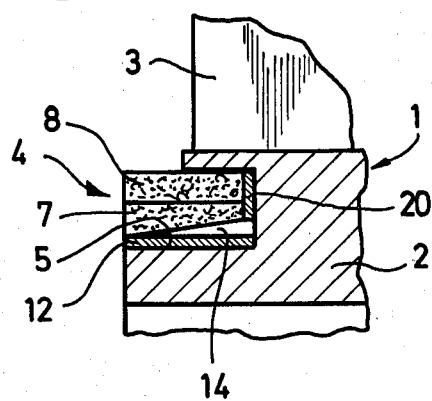
FIG. 5 is a view similar to FIG. 3, according to another preferred embodiment of the invention.

For example, FIG. 5 shows an arrangement corresponding substantially to that of FIG. 3, except that the bandage comprises an inner retaining ring 7 and an outer retaining ring 8 whose material properties correspond to the retaining rings 7 and 8 in the embodiments illustrated in FIG. 1. A gap 14 (of the kind provided in the embodiment of FIG. 3 between the support surface and the inner surface of adjacently disposed retaining rings 10 and 11) is provided between the inner retaining rings 7 and the support surface provided by the metal ring 12.

A multiple component construction of the bandage is also possible in which adjacently disposed retaining rings, described with reference to the embodiments in illustrated in FIGS. 2 to 4, are supplemented by one or more additional retaining rings, disposed outside in the radial direction, corresponding to the construction of the bandage of FIG. 1. The retaining rings disposed further on the outside can also be additionally subdivided into axially adjacently disposed retaining rings.

Subdivision of the bandage into individual retaining rings of different tensile strength and different stiffness all together leads to a reduction of the possible deformations in the region of force application under the influence of centrifugal forces. Adaptation to the yield characteristics of the segmented rotor disk is thus made possible.

I claim:

1. Annular retainer means for maintaining in an assembled condition a segmented hollow rotor formed from a plurality of circumferentially arranged radial segments (1) each having a base portion (2) and a blade portion (3), the base portions of said segments being in lateral engagement and the blade portions extending radially outwardly from said base portion, respectively, said base portions including axially extending shoulders (5,6) which cooperate to define at each end of the rotor a cylindrical support surface, said retainer means comprising
   (a) a first annular retainer member (7,10) mounted concentrically about one of said cylindrical support surfaces, said first retainer member being formed of first fiber-reinforced material having a relatively low stiffness and a relatively high tensile strength, said first retainer member being shrunk fit upon said cylindrical support surface to initially compress said segment base portions radially inwardly when the rotor is stationary; and
   (b) a second annular retainer member (8,11) arranged in contiguous coaxial relation with said first retainer member, said second retainer member being formed of a second fiber-reinforced material having a relatively high stiffness and a relatively low tensile strength, whereby upon rotation of the rotor assembly to a velocity at which the centrifugal force generated by the rotor segments overcomes the initial compression produced by said first retainer member, said second retainer member operates to limit the degree of expansion of said first retainer member.

2. Apparatus as defined in claim 1, wherein said second annular retainer member is arranged concentrically about said first annular retainer member, the inner diameter of said second retainer member corresponding with the outer diameter of said first retainer member.

3. Apparatus as defined in claim 2, wherein each end surface of the rotor contains an annular recess the inner diameter of which corresponds with the shoulder diameter, the radial thickness of said recess corresponding with the combined thicknesses of said first and second annular retainer members, said first and second annular members being partially arranged within said recess, the outer diameter of said second annular retainer member corresponding with the outer diameter of said recess.

4. Apparatus as defined in claim 3, wherein the inner diameter of said first annular retainer member converges axially toward the end of the rotor, respectively, thereby to define a converging gap (14) between said first annular retainer member and said shoulder.

5. Apparatus as defined in claim 1, wherein said second annular retainer member is arranged laterally relative to said first annular retainer member, the inner diameter of said second retainer member being slightly greater than the inner diameter of said first annular retainer member.

6. Apparatus as defined in claim 5, wherein each end surface of the rotor contains an annular recess the inner diameter of which corresponds with the shoulder diameter, the radial thickness of said recess being slightly greater than the thickness of said second annular retainer member, said second annular retainer member being arranged within said recess, the outer diameter of said second annular retainer member corresponding with the outer diameter of said recess.

7. Apparatus as defined in claim 6, wherein the inner diameters of said second and first annular retainer members linearly converge axially toward each end of the rotor, respectively, thereby to define a converging gap (14) between said second and first annular retainer members and said shoulders, respectively.

8. A rotor assembly, comprising
   (a) at least one segmented hollow rotor formed from a plurality of circumferentially arranged radial segments (1) each having a base portion (2) and a blade portion (3), the base portions of said segments being in lateral engagement and the blade portions extending radially outwardly from said base portions, respectively, said base portions including axially extending shoulders (5,6) which cooperate to define at each end of the rotor a cylindrical support surface; and
   (b) means for retaining said segmented rotor in an assembled condition, said retainer means including
      (1) a first annular retainer member (7,10) mounted concentrically about one of said cylindrical support surfaces, said first retainer member being formed of first fiber-reinforced material having a relatively low stiffness and a relatively high tensile strength, said first retainer member being shrunk fit upon said cylindrical support surface to initially compress said segment base portions radially inwardly when the rotor is stationary; and (2) a second annular retainer member (8,11) arranged in contiguous coaxial relation with said first retainer member, said second retainer member being formed of a second fiber-reinforced material having a relatively high stiffness and a relatively low tensile strength, whereby upon rotation of the rotor assembly to a velocity at which the centrifugal force generated by the rotor segments overcomes the initial compression produced by said first retainer member, said second retainer member operates to limit the degree of expansion of said first retainer member.

9. Apparatus as defined in claim 8, and further comprising a plurality of segmented hollow rotors arranged coaxially in spaced relation, said retaining means further comprising spacer means (15) formed of a third fiber-reinforced material and connected on opposite ends with said first annular retainer members of adjacent rotors, respectively.

10. Apparatus as defined in claim 9, wherein the tensile strength and relative stiffness of said spacer means provides a friction connection between said spacer means and said first annular retainer members, respectively, during rotation of said rotors.

* * * * *